United States Patent
Kato et al.

[11] Patent Number: 6,067,329
[45] Date of Patent: May 23, 2000

[54] VSB DEMODULATOR

[75] Inventors: Hisaya Kato; Seiji Sakashita, both of Hirakata; Kunio Ninomiya, Osaka, all of Japan

[73] Assignee: Matsushita Electric Industrial Co., Ltd., Osaka, Japan

[21] Appl. No.: 08/866,885

[22] Filed: May 30, 1997

[30] Foreign Application Priority Data

May 31, 1996 [JP] Japan .................................. 8-137925

[51] Int. Cl.[7] .............................. H04L 27/06; H04L 27/22
[52] U.S. Cl. ........................ 375/321; 375/324; 375/332; 375/344; 329/304; 329/357
[58] Field of Search ..................... 375/270, 281, 375/321, 324, 325, 326, 332, 344; 329/304, 357

[56] References Cited

U.S. PATENT DOCUMENTS

| | | | |
|---|---|---|---|
| 5,588,025 | 12/1996 | Strolle et al. | 375/316 |
| 5,673,293 | 9/1997 | Scarpa et al. | 375/321 |
| 5,724,396 | 3/1998 | Claydon et al. | 375/355 |
| 5,809,088 | 9/1998 | Han | 375/344 |

FOREIGN PATENT DOCUMENTS 7-326951  12/1995  Japan .

*Primary Examiner*—Young T. Tse
*Attorney, Agent, or Firm*—Ratner & Prestia

[57] ABSTRACT

A Vestigal Sideband (VSB) demodulator having a clock generator for generating a clock signal based on a symbol frequency of the VSB signal; an A/D converter for converting the VSB signal into a digital signal based on the clock signal of the clock generator; a first multiplier for multiplying the digital signal by a first value sequence and generating a first multiplier output signal; a second multiplier for multiplying the digital signal by a second value sequence and generating a second multiplier output signal; a complex type filter for shaping and VSB demodulation of the multiplier output signals and generating Inphase and Quadrature data output signals; a decimating circuit for decimating the Inphase and Quadrature data output signals and generating decimated signals; a complex multiplier for multiplying the decimated signals by a predetermined value and generating multiplied output signals; an error detector for detecting a frequency deviation and a phase deviation from the multiplied output signals and generating the predetermined value for the complex multiplier; and DC offset canceler for removing a DC component from a portion of the multiplied output signals of the complex multiplier.

3 Claims, 16 Drawing Sheets

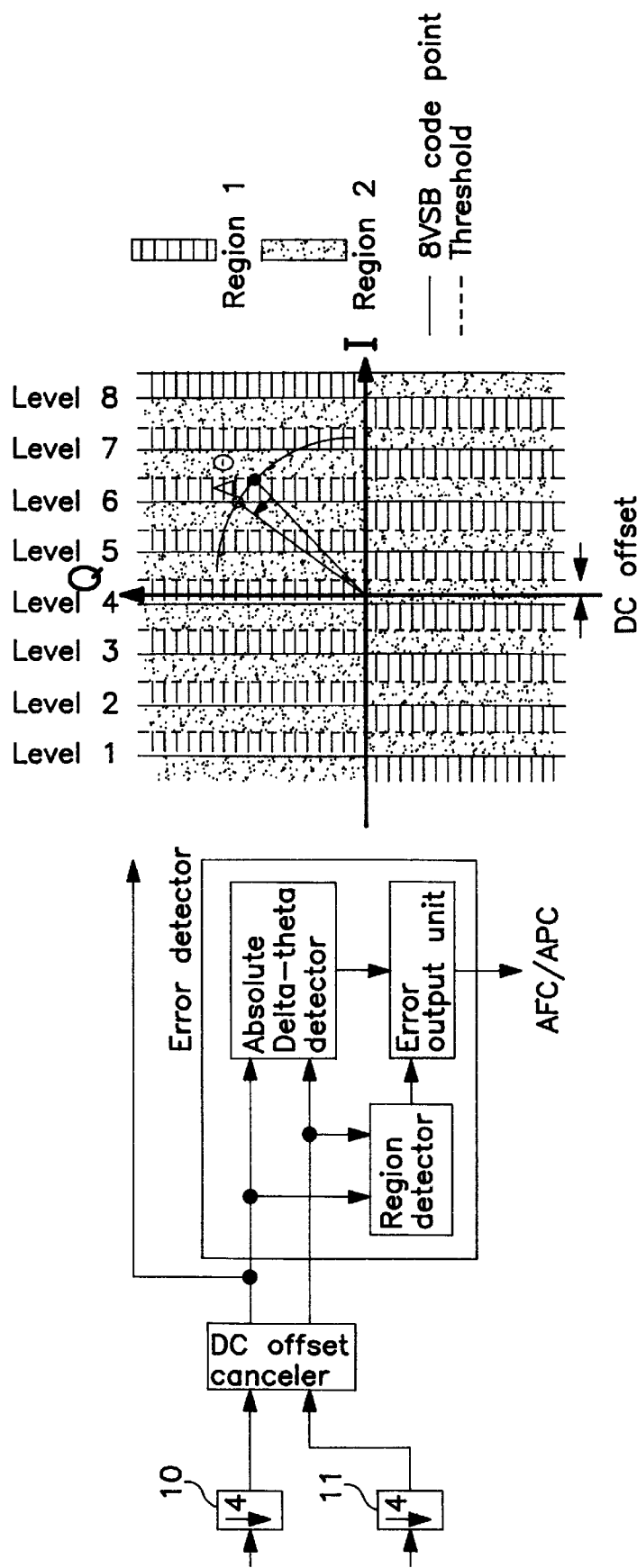

VSB DEMODULATOR

BACKGROUND OF THE INVENTION

1. Field of the Invention

The present invention relates to a television signal transmission system, and more particularly to a VSB demodulator of a digital television signal receiver employing the VSB demodulation system.

2. Related Art of the Invention

A conventional VSB demodulator is disclosed, for example, in Japanese Laid-open Patent No. 7-326951.

FIG. 16 shows a constitution of this conventional VSB demodulator. In this demodulator, an RF signal of a received digital VSB modulation wave is converted into a frequency of IF band by using a local oscillator 161 and a multiplier 162. This IF signal is converted into a base band signal of in-phase channel by an output signal of a local oscillator 163 and a multiplier 164, and is further converted into a base band signal of an orthogonal channel by the local oscillator 163, a π/2 (half-pi) phase shifter 165, and a multiplier 166. The base band signal is suppressed of its high frequency by low-pass filters 167, 168, and is converted into a digital signal by A/D converters 169, 170, and the waveform is shaped by base band filters 171, 172, and the signal is demodulated into a VSB signal by an adder 173.

In such conventional VSB demodulator, since the signal is processed by the analog circuit using the half-pi phase shifter, it is required to compensate for factors of deterioration of orthogonality of the half-pi phase shifter or temperature characteristic by the analog circuit.

SUMMARY OF THE INVENTION

In the light of such problems of the conventional demodulator, it is hence an object of the invention to present a VSB demodulator not causing factors of deterioration of orthogonality of the half-pi phase shifter or temperature characteristic by the analog circuit, by employing the digital wave detection system in VSB demodulation.

The invention as set forth in claim 1 relates to a VSB demodulator comprising a clock generator for generating a clock of four times of a symbol frequency from a received digital VSB modulated wave, an A/D converter for converting the VSB modulated wave into a digital signal by the clock of an output signal of the clock generator, a first multiplier for multiplying repeatedly the converted digital signal by +1, 0, −1, 0 at the timing of the clock of the output signal of the clock generator, a second multiplier for multiplying repeatedly the converted digital signal by 0, +1, 0, −1 at the timing of the clock of the output signal of the clock generator, a complex type filter for executing spectrum shaping and VSB demodulation on the output signals of the two multipliers, a first decimating circuit for decimating the Inphase data output of the complex type filter to a quarter, a second decimating circuit for decimating the Quadrature data of the complex type filter to a quarter, a complex multiplier for multiplying the output signals of the two decimating circuits by an inverse vector for compensating for the frequency deviation and phase deviation, an error detector for detecting the frequency deviation and phase deviation from the output signal of the complex multiplier, and issuing the inverse vector of the frequency deviation and phase deviation to the complex multiplier, and a DC offset canceler for removing the DC offset value from the Inphase data output of the complex multiplier.

BRIEF DESCRIPTION OF THE DRAWINGS

FIGS. 15A–B are explanatory diagrams of changing the position of DC offset canceler in the VSB demodulator in any one of embodiments 2, 3, 6, 8.

REFERENCE NUMERALS

Figure 1:
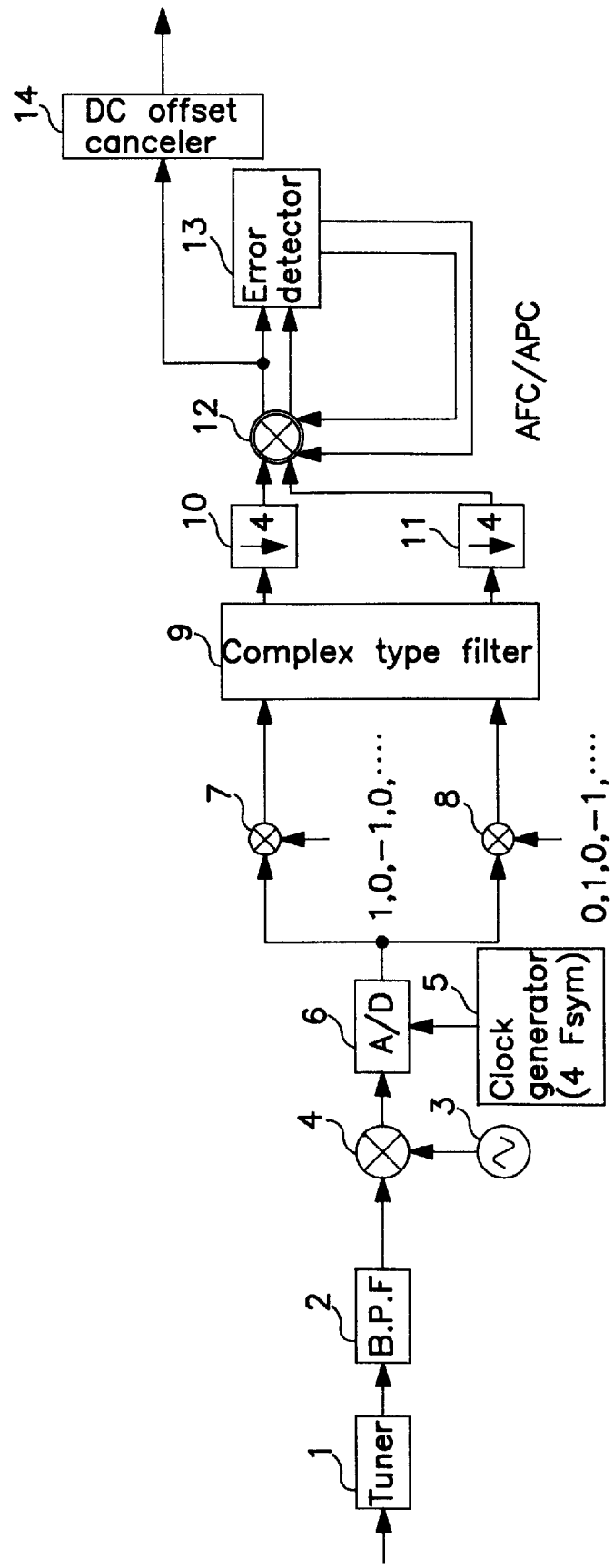
FIG. 1 is a block diagram of a VSB demodulator according to embodiment 1 of the invention.

1 Tuner
2, 51 Band pass filter
3, 161, 163 Local oscillator
4, 162 Frequency converter
5 Clock generator
6, 169, 170 A/D converter
7, 8, 34, 35, 91 Multiplier
9 Complex type filter
10, 11, 31, 33, 36, 37 Decimating circuit
12 Complex multiplier
13 Error detector
14 DC offset canceler
21 Voltage control oscillator
22 Error detector
32 Latch
92 Selector
101, 102 FIR filter
103 Subtractor
104, 173 Adder
111 Δθ (Delta-theta) detector
112 −Δθ (minus Delta-theta) output unit
121 |Δθ| (absolute Delta-theta) detector
122 Region detector
123 Error output unit
165 π/2 (half-pi) phase shifter
167, 168 Low-pass filter
171, 172 Base band filter

DETAILED DESCRIPTION OF THE PREFERRED EMBODIMENTS

Referring now to the drawings, preferred embodiments the invention are described in detail below.

(Embodiment 1)

FIG. 1 is a block diagram of a VSB demodulator in embodiment 1 of the invention. In FIG. 1, reference numeral 1 is a tuner for receiving a digital VSB modulated RF signal and converting into an IF signal, 2 is a band pass filter, 3 is a local oscillator, 4 is a frequency converter for converting the IF signal into a second IF signal, 5 is a clock generator for generating a clock of four times of a symbol frequency, 6 is an A/D converter for converting an analog signal into a digital signal, 7 is a first multiplier for multiplying repeatedly +1, 0, −1, 0 at the timing of a clock of four times of the symbol frequency, 8 is a second multiplier for multiplying repeatedly 0, +1, 0, −1 at the timing of a clock of four times of the symbol frequency, 9 is a complex type filter for processing Inphase and Quadrature data by spectrum shaping and VSB demodulation, 10 is a first decimating circuit for decimating Inphase data to a quarter, 11 is a second decimating circuit for decimating Quadrature data to a quarter, 12 is a complex multiplier, 13 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and extra spurious signals other than the IF signal are blocked by the band pass filter 2. The IF signal passing through the band pass filter 2 is converted into a second IF signal by the local oscillator 3 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are repeatedly multiplied by +1, 0, −1, 0 at the timing of the clock of the clock generator 5 by the first multiplier 7, and repeatedly multiplied by 0, +1, 0, −1 at the timing of the clock of the clock generator 5 by the second multiplier 8. After spectrum shaping and demodulation in the complex type filter 9, the Inphase data and the Quadrature data are interpolated to a quarter by the first decimating circuit 10 and second decimating circuit 11, respectively, to be converted into the original signal stream. Herein, the quarter interpolating process is effected by using the signal of the symbol frequency for clock regeneration.

These Inphase and Quadrature data are put into the complex multiplier 12, and from the output of this complex multiplier 12, the frequency deviation and phase deviation vector is detected by the error detector 13, and by multiplying the inverse vector of the detected frequency deviation and phase deviation by the complex multiplier 12, the frequency deviation and phase deviation can be eliminated, and the output Inphase data of the complex multiplier 12 becomes the VSB demodulated data. Since a DC offset is included in the VSB demodulated data, by removing the DC offset by the DC offset canceler 14, the VSB demodulated data only is obtained.

Figure 10:
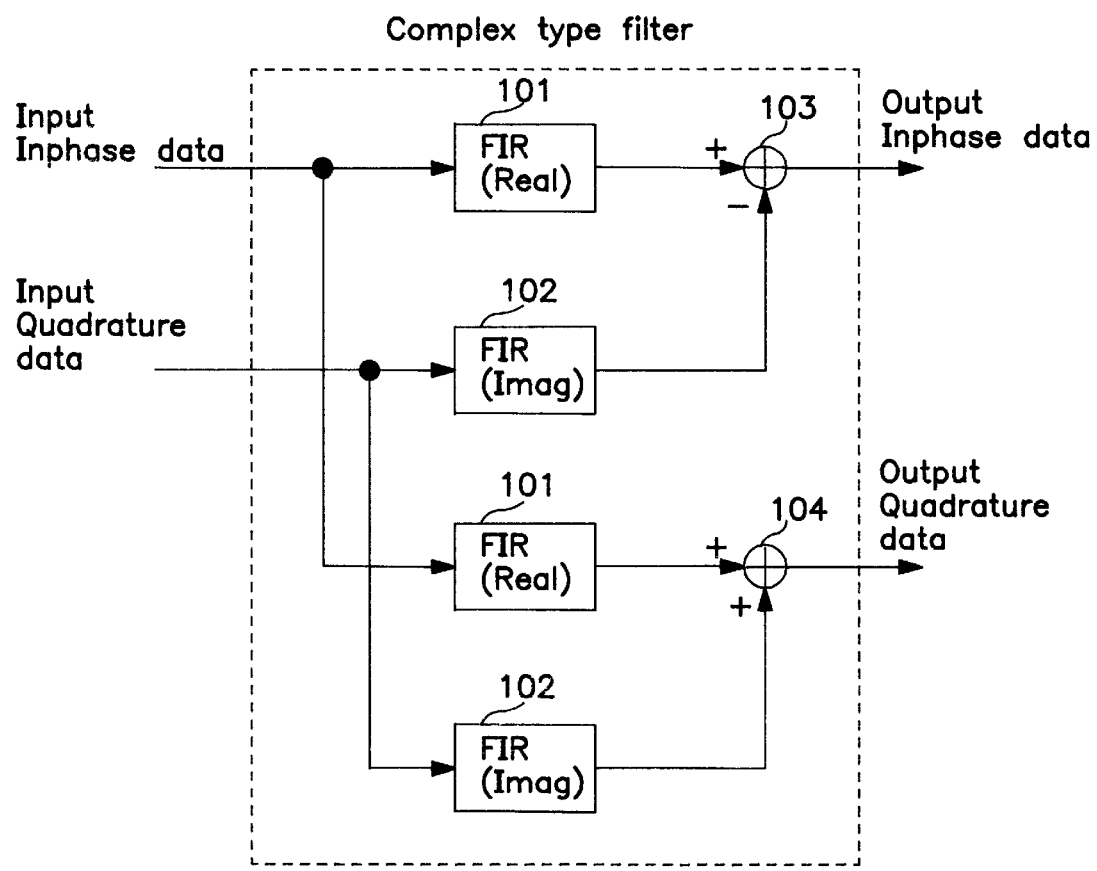
FIG. 10 is an explanatory diagram of a complex type filter in the VSB demodulator in any one of embodiments 1 to 4.

Next, an example of the complex type filter 9 is explained by referring to FIG. 10. In FIG. 10, reference numeral 101 is a coefficient of a real portion of an FIR filter, 102 is a coefficient of an imaginary portion of the FIR filter, 103 is a subtractor, and 104 is an adder.

In thus constituted complex type filter, the operation is described below. First, the input Inphase data is multiplied by the coefficient 101 of the real portion of the FIR filter, and the input Quadrature data is multiplied by the coefficient 102 of the imaginary portion of the FIR filter, and their multipliers are put into the subtractor 103, and Inphase data processed by spectrum shaping and VSB demodulation is obtained. Similarly, the input Inphase data is multiplied by the coefficient 101 of the real portion of the FIR filter, and the input Quadrature data is multiplied by the coefficient 102 of the imaginary portion of the FIR filter, and their multipliers are put into the adder 104, and Quadrature data processed by spectrum shaping and VSB demodulation is obtained.

Herein, the complex type filter is a filter coefficient having a frequency band of four times of the symbol frequency, and the transmission function of the FIR filter expresses Nyquist second standard roll-off characteristic and Nyquist processing characteristic for VSB modulated wave. Incidentally, the FIR filter may be a multiplex structure.

Figure 11B:
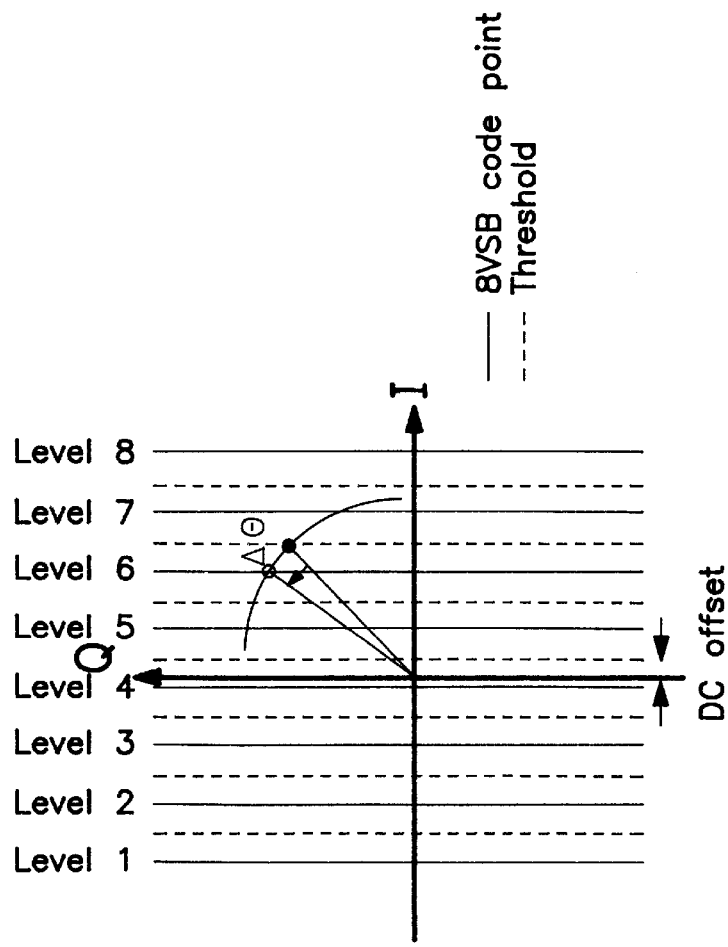
FIGS. 11A–B are explanatory diagrams of an error detector in the VSB demodulator in any one of embodiments 1, 3, 5, 7.
Figure 11A:
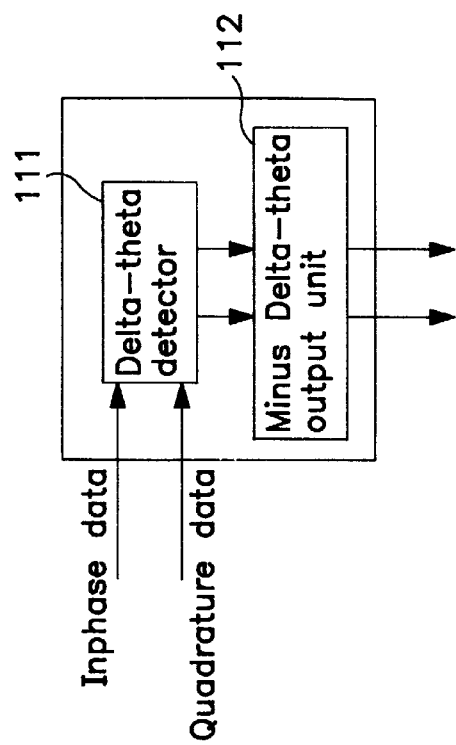

An example of the error detector 13 is explained by referring to FIGS. 11A–B. In FIGS. 11A–B, reference numeral 111 is a Delta-theta detector for detecting how much the Inphase and Quadrature data as output signals of the complex multiplier 12 are deviated from the original code point, and 112 is a minus Delta-theta output unit for issuing an inverse output of the deviation.

In thus constituted error detector 13, the operation is described below. First, the entered Inphase and Quadrature data are plotted on the I-Q plane as shown in FIGS. 11A–B. At this time, if the frequency and phase are deviated, it means rotation about the origin of the I- and Q-axes, and it is the same distance from the origin, and the intersection of the code point level judged from the entered Inphase and Quadrature data (level 6 in FIGS. 11A–B) is the code point assigned at the time of modulation. Therefore, by detecting the vector from the entered Inphase and Quadrature data to the code point assigned at the time of modulation by the Delta-theta detector 111, and issuing the inverse vector of the frequency and phase deviation to the complex multiplier 12 by the minus Delta-theta output unit 112, the frequency and phase deviation can be eliminated.

Thus, according to the constitution of the embodiment, the operation of the automatic frequency control (AFC) or automatic phase control (APC) can be realized by the digital section only, and the analog and digital sections can be separated, and operation checking is easy, and moreover since the loop delay is small, high speed operation is realized. Still more, only one A/D converter is needed because A/D conversion is effected before detection.

Figure 13B:
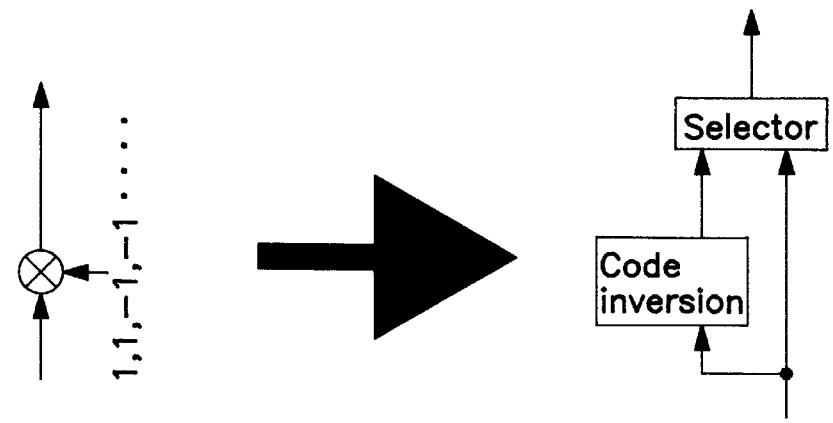
FIGS. 13A–B are explanatory diagrams for eliminating the multiplier in the VSB demodulator in any one of embodiments 1 to 8.
Figure 13A:
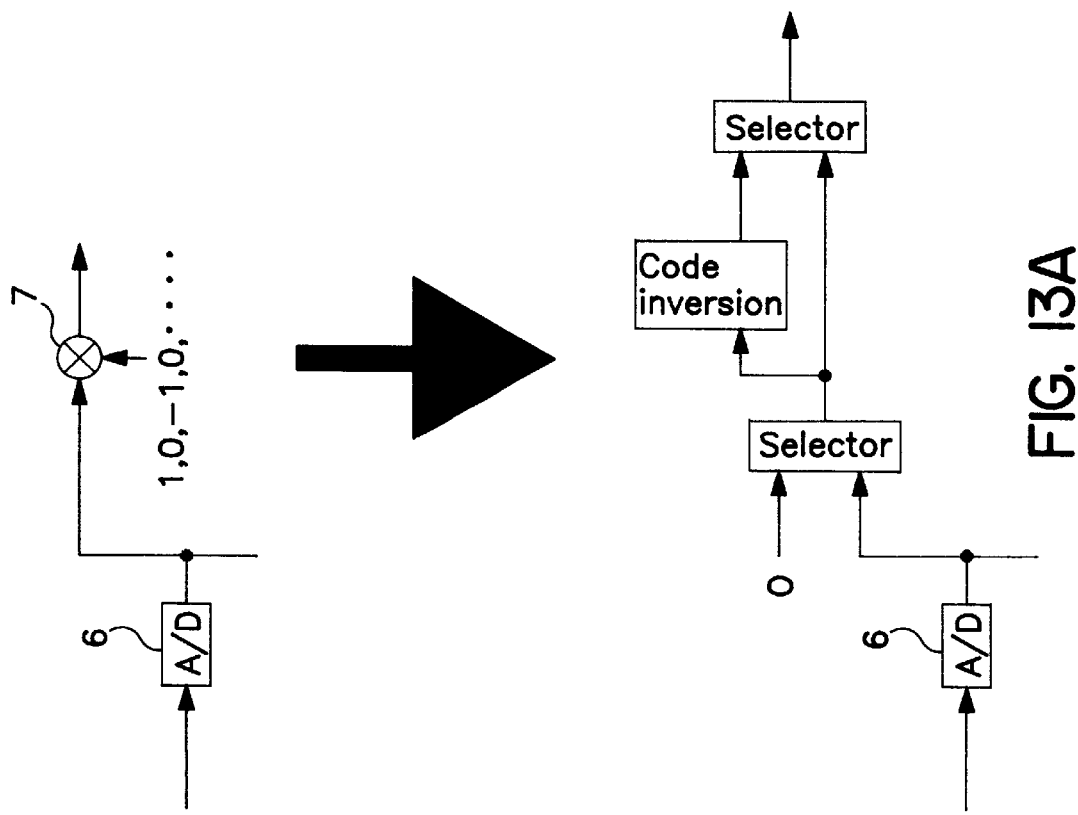

In embodiment 1, the multipliers 7, 8 are used in the detection unit, but the constitution and operation for multiplying repeatedly +1, 0, −1, 0 may be realized by using the selector and code inverter as shown in FIGS. 13A–13B.

Figures 14A, 14B:
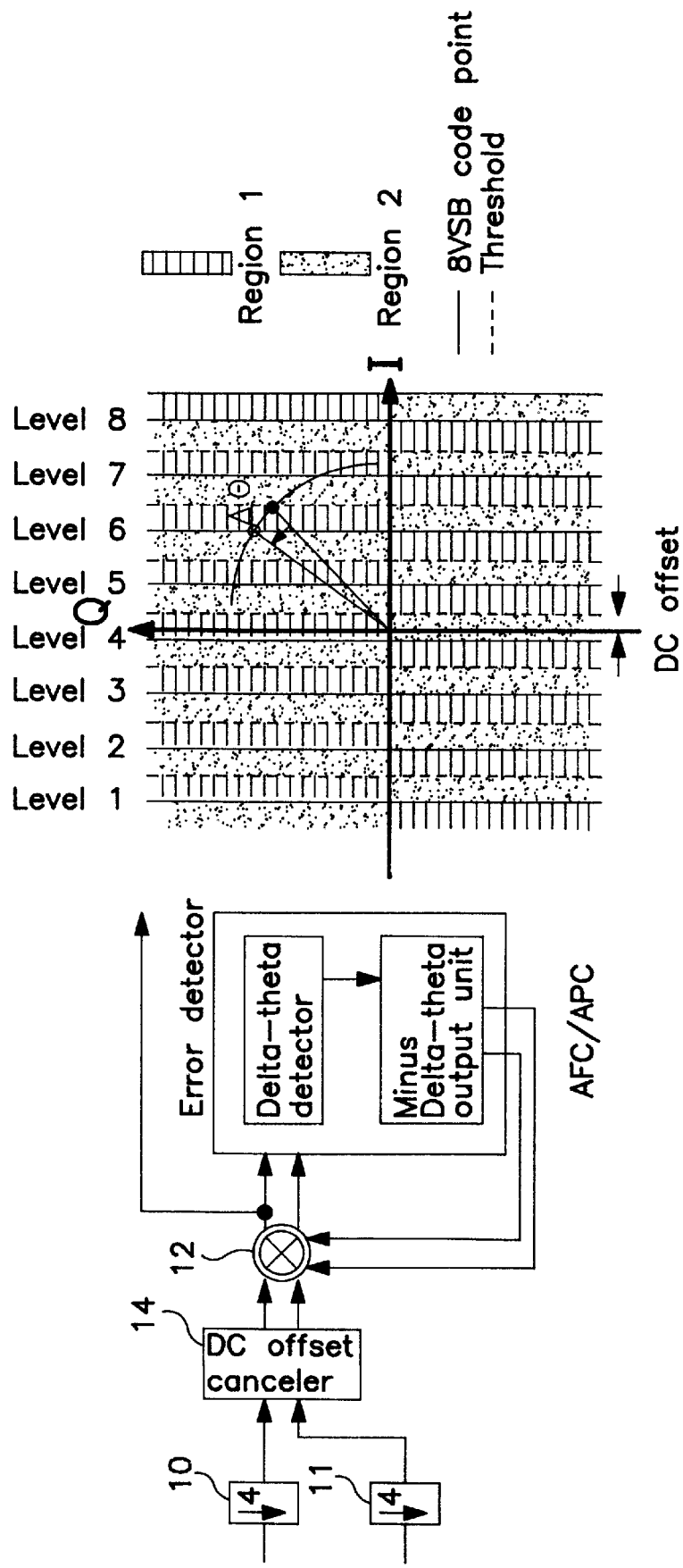
FIGS. 14A–B are explanatory diagrams of changing the position of DC offset canceler in the VSB demodulator in any one of embodiments 1, 3, 5, 7, 9.
Figure 16:
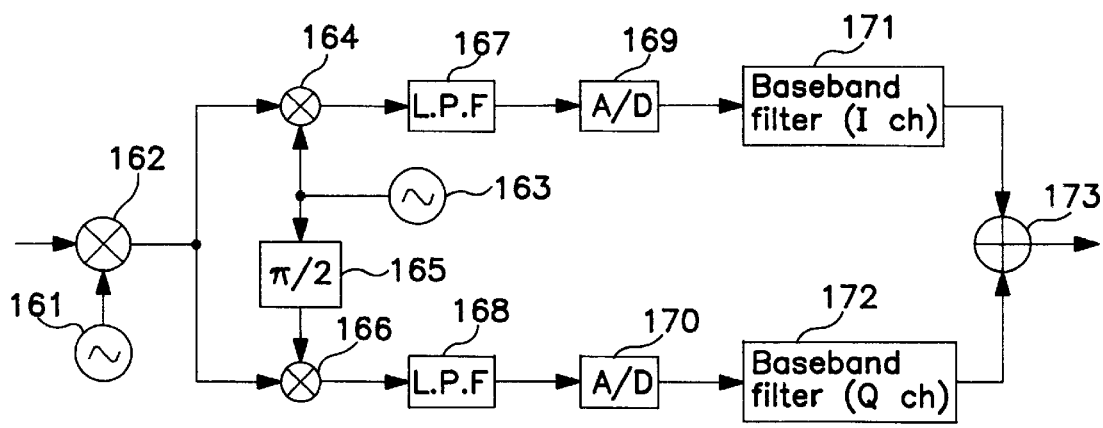
FIG. 16 is a block diagram of a VSB demodulator in a prior art.

Also in embodiment 1, the DC offset canceler 14 is connected to the output side of the complex multiplier 12, but as shown in FIGS. 14A–14B, it may be also connected to the input side. At this time, the Delta-theta detector is based on the origin of the I- and Q-axes.

Moreover in embodiment 1, instead of the FIR filter used for realizing the complex type filter 9, it may be also realized by the IIR filter.

(Embodiment 2)

Figure 2:
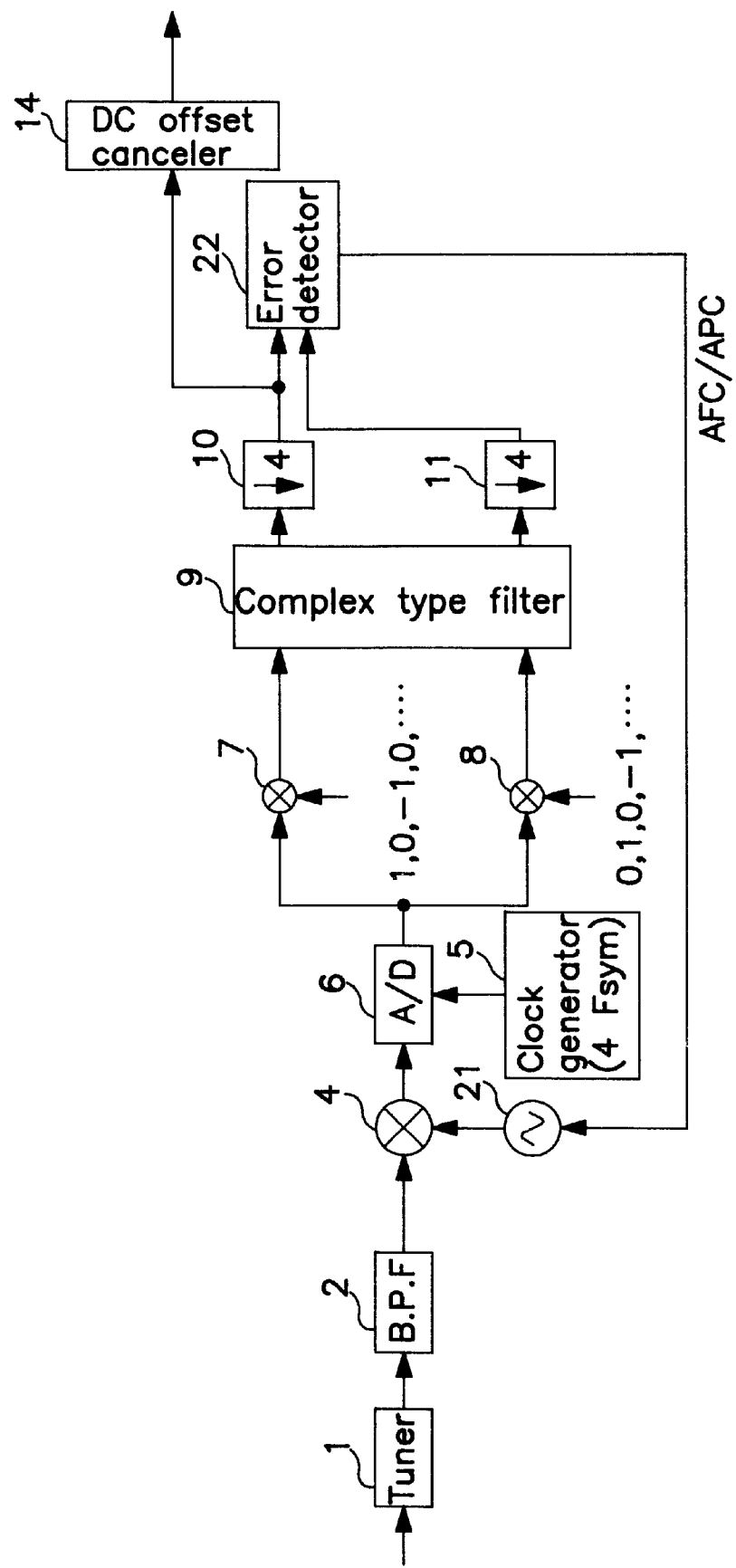
FIG. 2 is a block diagram of a VSB demodulator according to embodiment 2 of the invention.

FIG. 2 is a block diagram of a VSB demodulator in embodiment 2 of the invention. In FIG. 2, reference numeral 1 is a tuner for receiving a digital VSB modulated RF signal and converting into an IF signal, 2 is a band pass filter, 21 is a voltage control oscillator of which output frequency is determined by the control signal, 4 is a frequency converter for converting the IF signal into a second IF signal, 5 is a clock generator for generating a clock of four times of a symbol frequency, 6 is an A/D converter for converting an analog signal into a digital signal, 7 is a first multiplier for multiplying repeatedly +1, 0, −1, 0 at the timing of a clock of four times of the symbol frequency, 8 is a second multiplier for multiplying repeatedly 0, +1, 0, −1 at the timing of a clock of four times of the symbol frequency, 9 is a complex type filter for processing Inphase and Quadrature data by spectrum shaping and VSB demodulation, 10 is a first decimating circuit for decimating Inphase data to a quarter, 11 is a second decimating circuit for decimating Quadrature data to a quarter, 22 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and extra spurious signals other than the IF signal are blocked by the band pass filter 2. The IF signal passing through the band pass filter 2 is converted into a second IF signal by the voltage control oscillator 21 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are repeatedly multiplied by +1, 0, −1, 0 at the timing of the clock of the clock generator 5 by the first multiplier 7, and repeatedly multiplied by 0, +1, 0, −1 at the timing of the clock of the clock generator 5 by the second multiplier 8. After spectrum shaping and demodulation in the complex type filter 9, the Inphase data and the Quadrature data are interpolated to a quarter by the first decimating circuit 10 and second decimating circuit 11, respectively, to be converted into the original signal stream. Herein, the quarter interpolating process is effected by using the signal of the symbol frequency for clock regeneration.

From these Inphase and Quadrature data, a frequency and phase deviation vector is detected in the error detector 22, and on the basis of the inverse vector of the detected frequency deviation and phase deviation, a control voltage of the voltage control oscillator 21 is generated, and by controlling the voltage control oscillator 21 by this control signal, the frequency deviation and phase deviation can be eliminated, and the output Inphase data of the decimating circuit 10 becomes the VSB demodulated data. Since a DC offset is included in the VSB demodulated data, by removing the DC offset by the DC offset canceler 14, the VSB demodulated data only is obtained.

The complex type filter 9 operates same as in embodiment 1, and its description is omitted herein.

Figures 12A, 12B:
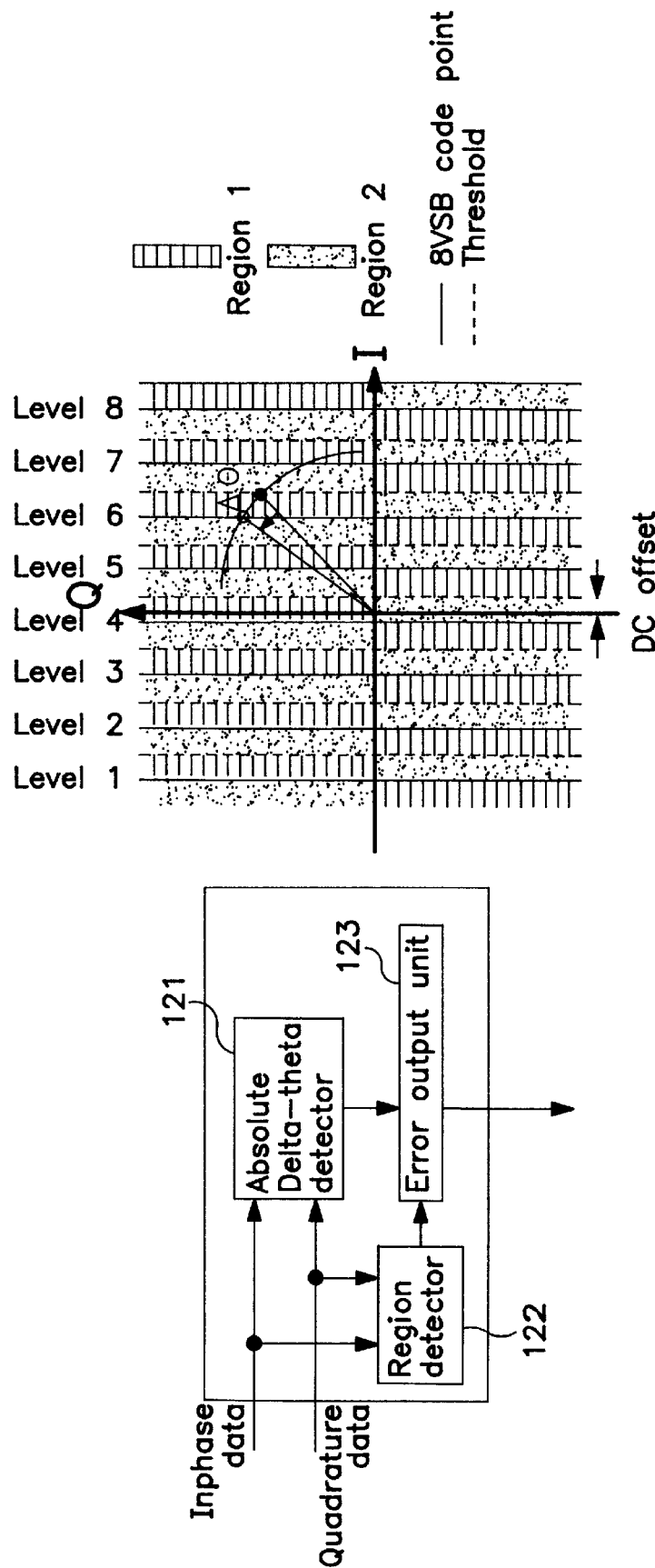
FIGS. 12A–B are explanatory diagrams of an error detector in the VSB demodulator in any one of embodiments 2, 3, 6, 8.

An example of the error detector 22 is described by referring to FIGS. 12A–B. In FIGS. 12A–B, reference numeral 121 is an absolute Delta-theta detector for detecting how much the Inphase and Quadrature data decimated at the symbol rate are deviated from the original code point, 122 is a region detector for judging whether the frequency and phase are advanced (region 2 in FIGS. 12A–B) or delayed (region 1 in FIGS. 12A–B) from the Inphase and Quadrature data, and 123 is an error output unit for generating a control voltage of the voltage control oscillator 21 from the output signals of the absolute Delta-theta detector and region detector.

In thus constituted error detector 22, the operation is described below. First, the entered Inphase and Quadrature data are plotted on the I-Q plane as shown in FIGS. 12A–B. At this time, if the frequency and phase are deviated, it means rotation about the origin of the I- and Q-axes, and it is the same distance from the origin, and the intersection of the code point level judged from the entered Inphase and Quadrature data (level 6 in FIGS. 12A–B) is the code point assigned at the time of modulation. Therefore, by detecting the magnitude of the vector from the entered Inphase and Quadrature data to the code point assigned at the time of modulation by the absolute Delta-theta detector 121, and similarly judging whether the frequency and phase are advanced form the Inphase and Quadrature data (region 2 in FIGS. 12A–B) or delayed (region 1 in FIGS. 12A–B) by the region detector 122, and by using the magnitude of the deviation vector and the deviation direction, the control voltage is issued from the error output unit 123 to the voltage control oscillator, so that the frequency and phase deviation can be eliminated.

Thus, according to the constitution of the embodiment, since the control signals of the AFC and APC are fed back to the voltage control oscillator 21, they are fed into the complex type filter 9 without frequency error and phase error, so that accurate spectrum shaping is realized. Besides, since the A/D conversion is executed before detection, only one A/D converter is needed.

In embodiment 2, the multipliers 7, 8 are used in the detection unit, but the constitution and operation for multiplying repeatedly +1, 0, −1, 0 may be realized by using the selector and code inverter as shown in FIGS. 13A–B.

Also in embodiment 2, the DC offset canceler 14 is connected before the error detector 22, but as shown in FIG. 15, it may be also connected between the first decimating circuit 10 and error detector 22. At this time, the absolute Delta-theta detector is based on the origin of the I- and Q-axes.

Moreover, in embodiment 2, to realize the AFC and APC, the control voltage is issued to the voltage control oscillator, but by installing a voltage control oscillator in the tuner, it may be issued into the oscillator.

(Embodiment 3)

Figure 3:
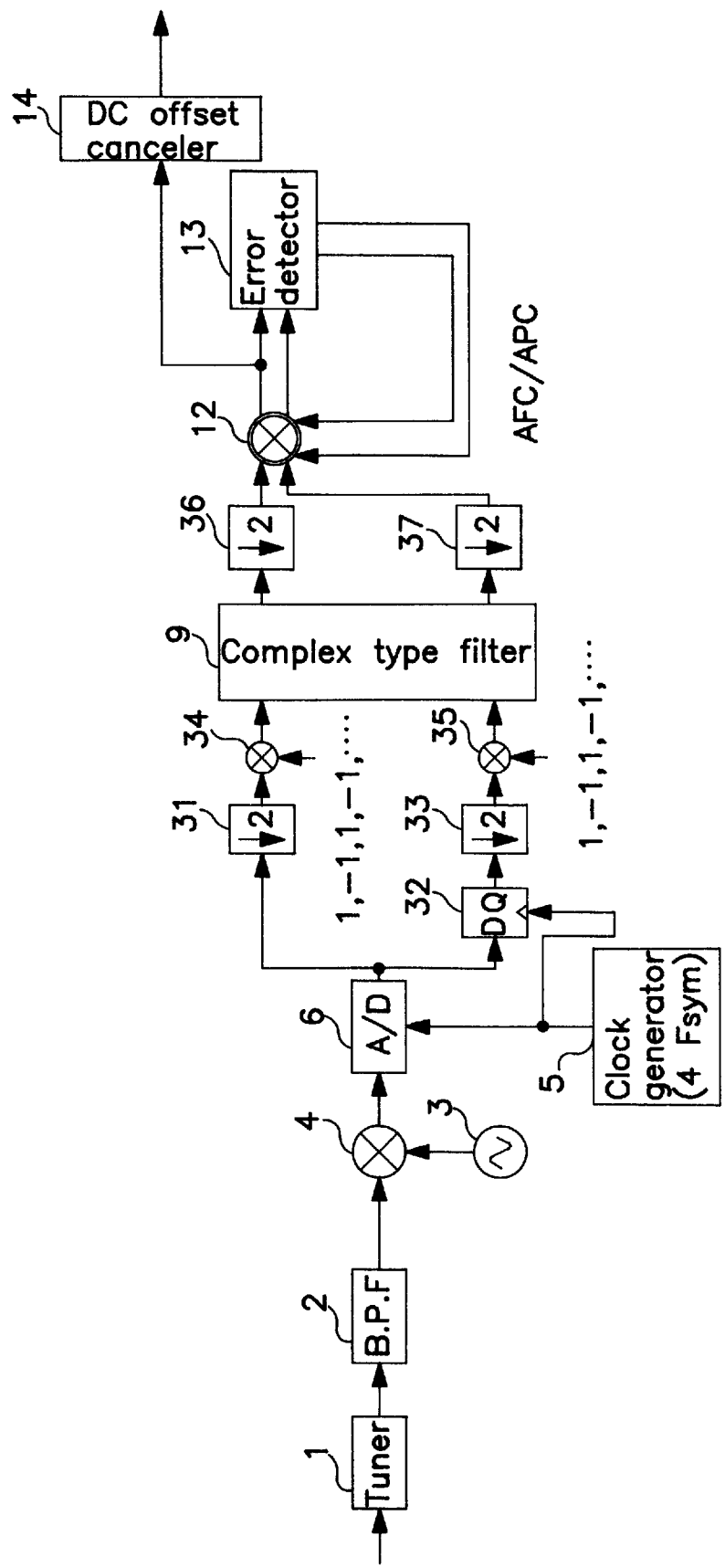
FIG. 3 is a block diagram of a VSB demodulator according to embodiment 3 of the invention.

FIG. 3 is a block diagram of a VSB demodulator in embodiment 3 of the invention. In FIG. 3, reference numeral 1 is a tuner for receiving a digital VSB modulated RF signal and converting into an IF signal, 2 is a band pass filter, 3 is a local oscillator, 4 is a frequency converter for converting the IF signal into a second IF signal, 5 is a clock generator for generating a clock of four times of a symbol frequency, 6 is an A/D converter for converting an analog signal into a digital signal, 31 is a first decimating circuit for decimating Inphase and Quadrature digital data to a half, 32 is a latch for operating the Inphase and Quadrature digital data by a clock of four times of the symbol frequency, 33 is a second decimating circuit for decimating the latch output signals of Inphase and Quadrature digital data to a half, 34 is a first multiplier for multiplying repeatedly the output signal of the first decimating circuit by +1, −1 at the timing of a clock of two times of the symbol frequency, 35 is a second multiplier for multiplying repeatedly the output signal of the second decimating circuit by +1, −1 at the timing of a clock of two times of the symbol frequency, 9 is a complex type filter for processing Inphase and Quadrature data by spectrum shaping and VSB demodulation, 36 is a third decimating circuit for decimating the Inphase data to a half, 37 is a fourth decimating circuit for decimating the Quadrature data to a half, 12 is a complex multiplier, 13 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and extra spurious signals other than the IF signal are blocked by the band pass filter 2. The IF signal passing through the band pass filter 2 is converted into a second IF signal by the local oscillator 3 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are decimated to a half by the first decimating circuit 31 to be Inphase data, and delayed by one timing by the latch 32 and decimated to a half by the second decimating circuit 33 to be Quadrature data. The Inphase data is repeatedly multiplied by +1, −1 at the clock timing of two times of the symbol frequency by the first multiplier 34, and the Quadrature data is repeatedly multiplied by +1, −1 at the clock timing of two times of the symbol frequency by the second multiplier 35. After spectrum shaping and demodulation in the complex type filter 9, the Inphase data and the Quadrature data are interpolated to a half by the third decimating circuit 36 and fourth decimating circuit 37, respectively, to be converted into the original signal stream. Herein, the half interpolating process is effected by using the signal of the symbol frequency for clock regeneration.

These Inphase and Quadrature data are entered in the complex multiplier 12, and from the output of this complex multiplier 12, a frequency and phase deviation vector is detected in the error detector 13, and an inverse vector of the frequency deviation and phase deviation being detected is multiplied in the complex multiplier 12, so that the frequency deviation and phase deviation can be eliminated, and the output Inphase data of the complex multiplier 12 becomes the VSB demodulated data. Since a DC offset is included in the VSB demodulated data, by removing the DC offset by the DC offset canceler 14, the VSB demodulated data only is obtained.

The complex type filter 9 operates same as in embodiment 1. The error detector 13 also operates same as in embodiment 1.

Thus, according to the constitution of the embodiment, since the Inphase and Quadrature digital signals are decimated to a half, and then put into the complex type filter, the complex type filter is only required to have a filter coefficient in a double band of the symbol frequency. Moreover, the operations of AFC and APC can be realized by the digital section only, and the analog and digital signals are separate, and the operation check is easy. Besides, since the A/D conversion is executed before detection, only one A/D converter is needed.

In embodiment 3, the multipliers 34, 35 are used in the detection unit, but the constitution and operation for multiplying repeatedly +1, −1 may be realized by using the selector and code inverter as shown in FIG. 13.

Incidentally, since all decimating circuits are designed to decimate to a half, the number of decimating circuits may be decrease by operating multiple times.

Similarly, by operating multiple times, the multipliers 34, 35 may be realized by one multiplier.
(Embodiment 4)

Figure 4:
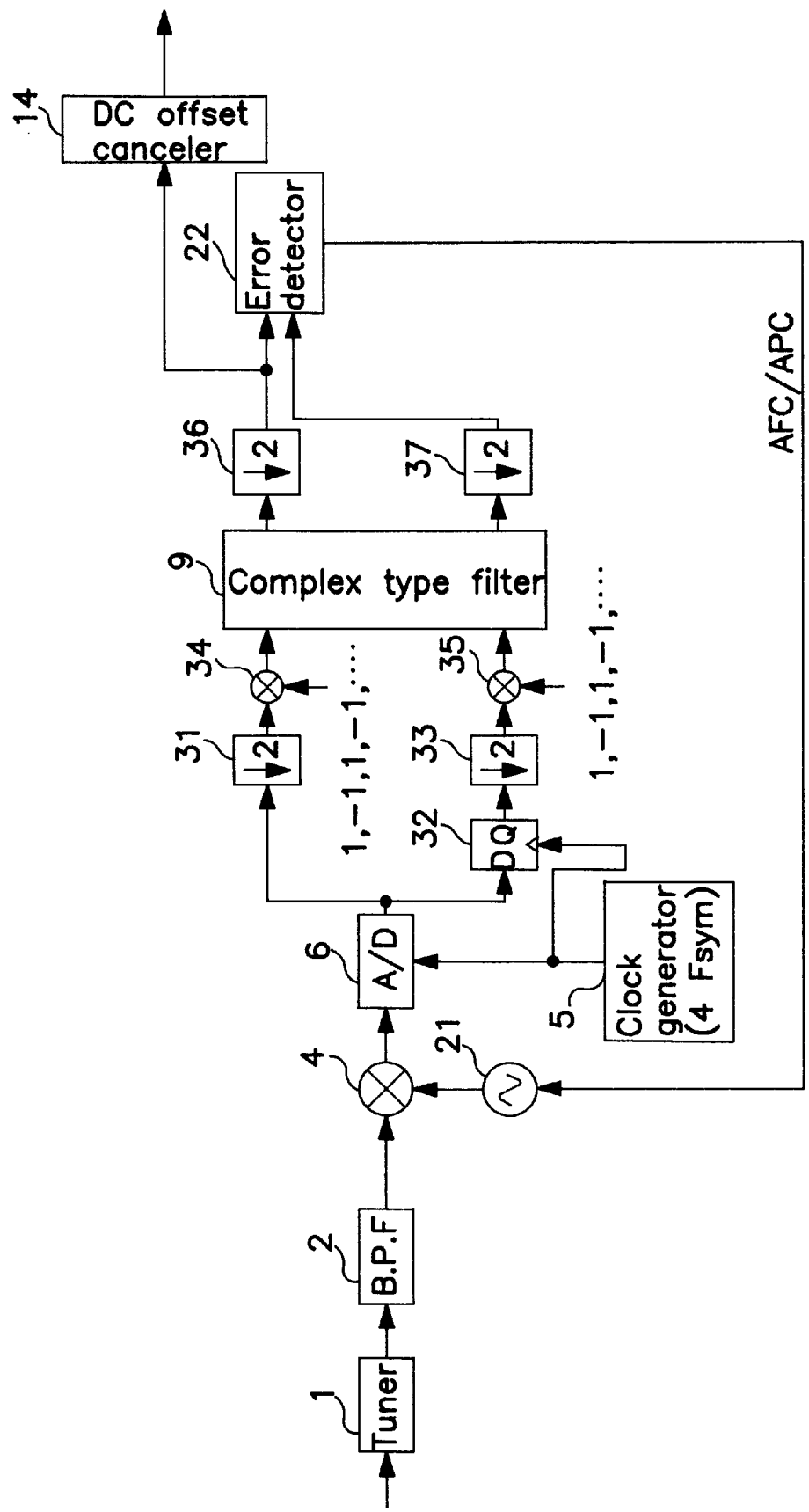
FIG. 4 is a block diagram of a VSB demodulator according to embodiment 4 of the invention.

FIG. 4 is a block diagram of a VSB demodulator in embodiment 4 of the invention. In FIG. 4, reference numeral 1 is a tuner for receiving a digital VSB modulated RF signal and converting into an IF signal, 2 is a band pass filter, 21 is a voltage control oscillator of which output frequency is determined by the control voltage, 4 is a frequency converter for converting the IF signal into a second IF signal, 5 is a clock generator for generating a clock of four times of a symbol frequency, 6 is an A/D converter for converting an analog signal into a digital signal, 31 is a first decimating circuit for decimating Inphase and Quadrature digital data to a half, 32 is a latch for operating the Inphase and Quadrature digital data by a clock of four times of the symbol frequency, 33 is a second decimating circuit for decimating the latch output signals of Inphase and Quadrature digital data to a half, 34 is a first multiplier for multiplying repeatedly the output signal of the first decimating circuit by +1, −1 at the timing of a clock of two times of the symbol frequency, 35 is a second multiplier for multiplying repeatedly the output signal of the second decimating circuit by +1, −1 at the timing of a clock of two times of the symbol frequency, 9 is a complex type filter for processing Inphase and Quadrature data by spectrum shaping and VSB demodulation, 36 is a third decimating circuit for decimating the Inphase data to a half, 37 is a fourth decimating circuit for decimating the Quadrature data to a half, 22 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and extra spurious signals other than the IF signal are blocked by the band pass filter 2. The IF signal passing through the band pass filter 2 is converted into a second IF signal by the voltage control oscillator 21 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are decimated to a half by the first decimating circuit 31 to be Inphase data, and delayed by one timing by the latch 32 and decimated to a half by the second decimating circuit 33 to be Quadrature data. The Inphase data is repeatedly multiplied by +1, −1 at the clock timing of two times of the symbol frequency by the first multiplier 34, and the Quadrature data is repeatedly multiplied by +1, −1 at the clock timing of two times of the symbol frequency by the second multiplier 35. After spectrum shaping and demodulation in the complex type filter 9, the Inphase data and the Quadrature data are interpolated to a half by the third decimating circuit 36 and fourth decimating circuit 37, respectively, to be converted into the original signal stream. Herein, the half interpolating process is effected by using the signal of the symbol frequency for clock regeneration.

From these Inphase and Quadrature data, a frequency and phase deviation vector is detected in the error detector 22, and on the basis of the inverse vector of the detected frequency deviation and phase deviation, a control voltage of the signal control oscillator 21 is generated, and by controlling the voltage control oscillator 21 by this control signal, the frequency deviation and phase deviation can be eliminated, and the output Inphase data of the third decimating circuit 36 becomes the VSB demodulated data. Since a DC offset is included in the VSB demodulated data, by removing the DC offset by the DC offset canceler 14, the VSB demodulated data only is obtained.

The complex type filter 9 operates same as in embodiment 1. The error detector 22 operates same as in embodiment 2.

Thus, according to the constitution of the embodiment, since the Inphase and Quadrature digital signals are decimated to a half, and then put into the complex type filter, the complex type filter is only required to have a filter coefficient in a double band of the symbol frequency. Moreover, since the control signals of the AFC and APC are fed back to the voltage control oscillator 21, they are fed into the complex type filter 9 without frequency error and phase error, so that accurate spectrum shaping is realized. Besides, since the A/D conversion is executed before detection, only one A/D converter is needed.

In embodiment 4, the multipliers 34, 35 are used in the detection unit, but the constitution and operation for multiplying repeatedly +1, -1 may be realized by using the selector and code inverter as shown in FIGS. 13A–B.

Incidentally, since all decimating circuits are designed to decimate to a half, the number of decimating circuits may be decrease by operating multiple times.

Similarly, by operating multiple times, the multipliers 34, 35 may be realized by one multiplier.

(Embodiment 5)

Figure 5:
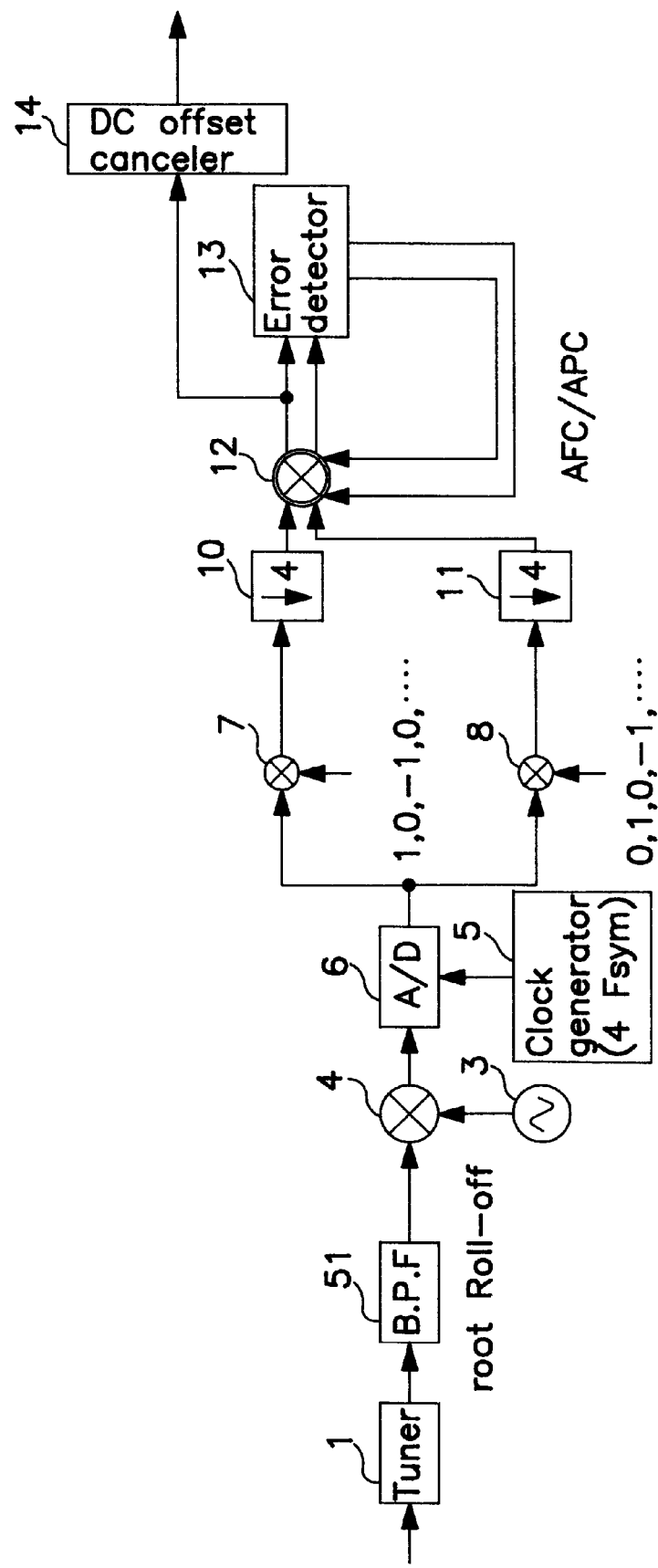
FIG. 5 is a block diagram of a VSB demodulator according to embodiment 5 of the invention.

FIG. 5 is a block diagram of a VSB demodulator in embodiment 5 of the invention. In FIG. 5, reference numeral 1 is a tuner for receiving a digital VSB modulated RF signal and converting into an IF signal, 51 is a root roll-off filter having a waveform shaping characteristic, 3 is a local oscillator, 4 is a frequency converter for converting the IF signal into a second IF signal, 5 is a clock generator for generating a clock of four times of a symbol frequency, 6 is an A/D converter for converting an analog signal into a digital signal, 7 is a first multiplier for multiplying repeatedly +1, 0, -1, 0 at the timing of a clock of four times of the symbol frequency, 8 is a second multiplier for multiplying repeatedly 0, +1, 0, -1 at the timing of a clock of four times of the symbol frequency, 10 is a first decimating circuit for decimating Inphase data of output signal of the first multiplier 7 to a quarter, 11 is a second decimating circuit for decimating Quadrature data of output signal of the second multiplier 8 to a quarter, 12 is a complex multiplier, 13 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and, while shaping the waveform by the root roll-off filter 51, extra spurious signals other than the IF signal are blocked. The IF signal passing through the root roll-off filter 51 is converted into a second IF signal by the local oscillator 3 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are repeatedly multiplied by +1, 0, -1, 0 at the timing of the clock of the clock generator 5 by the first multiplier 7, and repeatedly multiplied by 0, +1, 0, -1 at the timing of the clock of the clock generator 5 by the second multiplier 8. Then, the Inphase data as the output signal of the first multiplier 7 and the Quadrature data as the output signal of the second multiplier 8 are interpolated to a quarter by the first decimating circuit 10 and second decimating circuit 11, respectively, to be converted into the original signal stream. Herein, the quarter interpolating process is effected by using the signal of the symbol frequency for clock regeneration.

These Inphase and Quadrature data are put into the complex multiplier 12, and from the output of this complex multiplier 12, the frequency and phase deviation vector is detected by the error detector 13, and by multiplying the inverse vector of the detected frequency deviation and phase deviation by the complex multiplier 12, the frequency deviation and phase deviation can be eliminated, and the output Inphase data of the complex multiplier 12 becomes the VSB demodulated data. Since a DC offset is included, in the VSB demodulated data, by removing the DC offset by the DC offset canceler 14, the VSB demodulated data only is obtained.

The error detector 13 operates same as in embodiment 1.

Thus, according to the constitution of the embodiment, since the operations of AFC and APC can be realized by the digital section only, and the analog and digital signals are separate, and the operation check is easy, and the loop delay is small, so that high speed operation is realized. Besides, since the A/D conversion is executed before detection, only one A/D converter is needed.

Moreover, the characteristic of waveform shaping is realized in the analog filter, not in the digital complex type filter, the circuit scale of the digital section may be considerably small.

In embodiment 5, the multipliers 7, 8 are used in the detection unit, but the constitution and operation for multiplying repeatedly +1, 0, -1, 0 may be realized by using the selector and code inverter as shown in FIG. 13.

(Embodiment 6)

Figure 6:
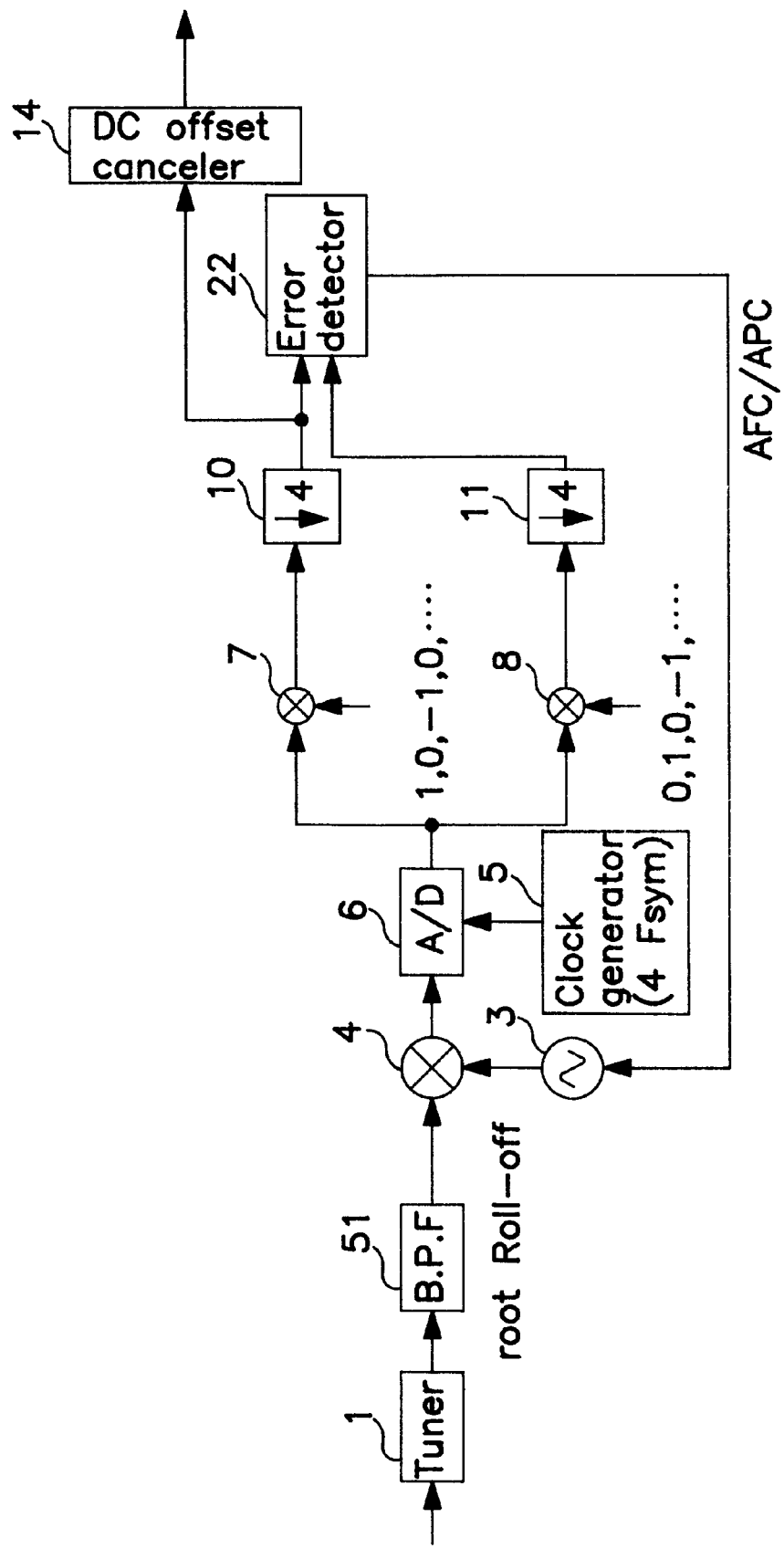
FIG. 6 is a block diagram of a VSB demodulator according to embodiment 6 of the invention.

FIG. 6 is a block diagram of a VSB demodulator in embodiment 6 of the invention. In FIG. 6, reference numeral 1 is a tuner for receiving a digital VSB modulated RF signal and converting into an IF signal, 51 is a root roll-off filter having a waveform shaping characteristic, 21 is a voltage control oscillator of which output frequency is determined by a control signal, 4 is a frequency converter for converting the IF signal into a second IF signal, 5 is a clock generator for generating a clock of four times of a symbol frequency, 6 is an A/D converter for converting an analog signal into a digital signal, 7 is a first multiplier for multiplying repeatedly +1, 0, -1, 0 at the timing of a clock of four times of the symbol frequency, 8 is a second multiplier for multiplying repeatedly 0, +1, 0, -1 at the timing of a clock of four times of the symbol frequency, 10 is a first decimating circuit for decimating Inphase data of output signal of the first multiplier 7 to a quarter, 11 is a second decimating circuit for decimating Quadrature data of output signal of the second multiplier 8 to a quarter, 22 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and, while shaping the waveform by the root roll-off filter 51, extra spurious signals other than the IF signal are blocked. The IF signal passing through the root roll-off filter 51 is converted into a second IF signal by the voltage control oscillator 21 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are repeatedly multiplied by +1, 0, -1, 0 at the timing of the clock of the clock generator 5 by the first multiplier 7, and repeatedly multiplied by 0, +1, 0, −1 at the timing of the clock of the clock generator 5 by the second multiplier 8. Then, the Inphase data as the output signal of the first multiplier 7 and the Quadrature data as the output signal of the second multiplier 8 are interpolated to a quarter by the first decimating circuit 10 and second decimating circuit 11, respectively, to be converted into the original signal stream. Herein, the quarter interpolating process is effected by using the signal of the symbol frequency for clock regeneration.

From these Inphase and Quadrature data, a frequency and phase deviation vector is detected in the error detector 22, and on the basis of the inverse vector of the detected frequency deviation and phase deviation, a control voltage of the voltage control oscillator 21 is generated, and by controlling the voltage control oscillator 21 by this control signal, the frequency deviation and phase deviation can be eliminated, and the output Inphase data of the decimating circuit 10 becomes the VSB demodulated data. Since a DC offset is included in the VSB demodulated data, by removing the DC offset by the DC offset canceler 14, the VSB demodulated data only is obtained.

Therein the error detector 22 operates same as in embodiment 2.

Thus, according to the constitution of the embodiment, since the control signals of the AFC and APC are fed back to the voltage control oscillator 21, they are fed into the complex type filter 9 without frequency error and phase error, so that accurate spectrum shaping is realized. Besides, since the A/D conversion is executed before detection, only one A/D converter is needed.

Moreover, since the characteristic of waveform shaping is realized in the analog filter, not in the digital complex type filter, the circuit scale of the digital section may be considerably small.

In embodiment 6, the multipliers 7, 8 are used in the detection unit, but the constitution and operation for multiplying repeatedly +1, 0, −1, 0 may be realized by using the selector and code inverter as shown in FIG. 14.

Moreover, the characteristic of waveform shaping is realized in the analog filter, not in the digital complex type filter, the circuit scale of the digital section may be considerably small.

(Embodiment 7)

Figure 7:
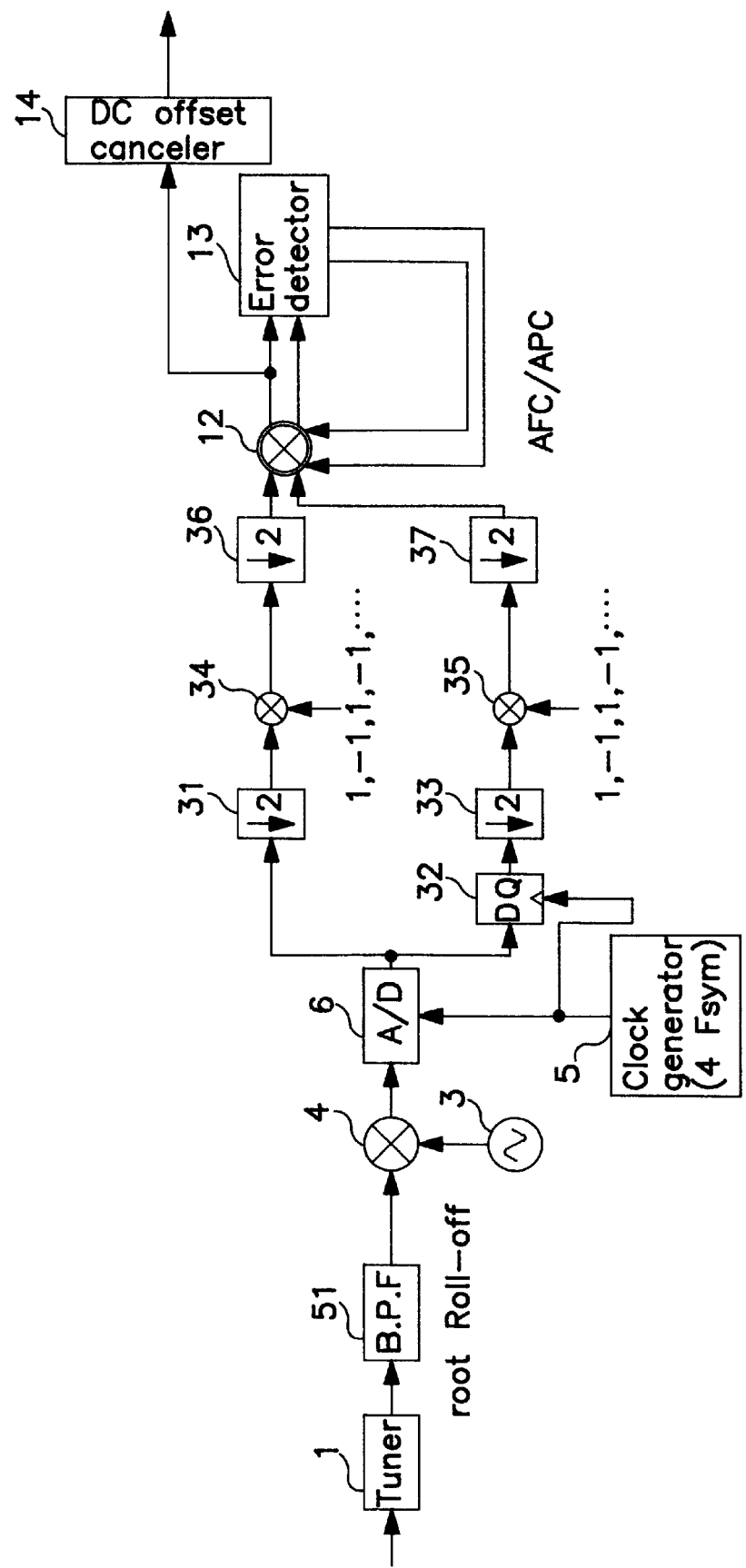
FIG. 7 is a block diagram of a VSB demodulator according to embodiment 7 of the invention.

FIG. 7 is a block diagram of a VSB demodulator in embodiment 7 of the invention. In FIG. 7, reference numeral 1 is a tuner for receiving a digital VSB modulated RF signal and converting into an IF signal, 51 is a root roll-off filter having a waveform shaping characteristic, 3 is a local oscillator, 4 is a frequency converter for converting the IF signal into a second IF signal, 5 is a clock generator for generating a clock of four times of a symbol frequency, 6 is an A/D converter for converting an analog signal into a digital signal, 31 is a first decimating circuit for decimating Inphase and Quadrature digital data to a half, 32 is a latch for operating the Inphase and Quadrature digital data by a clock of four times of the symbol frequency, 33 is a second decimating circuit for decimating the latch output signals of Inphase and Quadrature digital data to a half, 34 is a first multiplier for multiplying repeatedly the output signal of the first decimating circuit by +1, −1 at the timing of a clock of two times of the symbol frequency, 35 is a second multiplier for multiplying repeatedly the output signal of the second decimating circuit by +1, −1 at the timing of a clock of two times of the symbol frequency, 36 is a third decimating circuit for decimating the Inphase data of output signal of the first multiplier 34 to a half, 37 is a fourth decimating circuit for decimating the Quadrature data of output signal of the second multiplier 35 to a half, 12 is a complex multiplier, 13 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and, while shaping the waveform by the root roll-off filter 51, extra spurious signals other than the IF signal are blocked. The IF signal passing through the root roll-off filter 51 is converted into a second IF signal by the local oscillator 3 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are decimated to a half by the first decimating circuit 31 to be Inphase data, and delayed by one timing by the latch 32 and decimated to a half by the second decimating circuit 33 to be Quadrature data. The Inphase data is repeatedly multiplied by +1, −1 at the clock timing of two times of the symbol frequency by the first multiplier 34, and the Quadrature data is repeatedly multiplied by +1, −1 at the clock timing of two times of the symbol frequency by the second multiplier 35. Then, the Inphase data of output signal of the first multiplier 34 and the Quadrature data of output signal of the second multiplier 35 are interpolated to a half by the third decimating circuit 36 and fourth decimating circuit 37, respectively, to be converted into the original signal stream. Herein, the half interpolating process is effected by using the signal of the symbol frequency for clock regeneration.

These Inphase and Quadrature data are entered in the complex multiplier 12, and from the output of this complex multiplier 12, a frequency and phase deviation vector is detected in the error detector 13, and an inverse vector of the frequency deviation and phase deviation being detected is multiplied in the complex multiplier 12, so that the frequency deviation and phase deviation can be eliminated, and the output Inphase data of the complex multiplier 12 becomes the VSB demodulated data. Since a DC offset is included in the VSB demodulated data, by removing the DC offset by the DC offset canceler 14, the VSB demodulated data only is obtained.

The error detector 13 operates same as in embodiment 1.

Thus, since the Inphase and Quadrature digital signals are decimated to a half, and then put into the complex type filter, the complex type filter is only required to have a filter coefficient in a double band of the symbol frequency. Moreover, the operations of AFC and APC can be realized by the digital section only, and the analog and digital signals are separate, and the operation check is easy. Besides, since the A/D conversion is executed before detection, only one A/D converter is needed.

Moreover, since the characteristic of waveform shaping is realized in the analog filter, not in the digital complex type filter, the circuit scale of the digital section may be considerably small.

In embodiment 7, the multipliers 34, 35 are used in the detection unit, but the constitution and operation for multiplying repeatedly +1, −1 may be realized by using the selector and code inverter as shown in FIGS. 13A–B.

Incidentally, since all decimating circuits are designed to decimate to a half, the number of decimating circuits may be decrease by operating multiple times.

13

Similarly, by operating multiple times, the multipliers 34, 35 may be realized by one multiplier.

(Embodiment 8)

Figure 8:
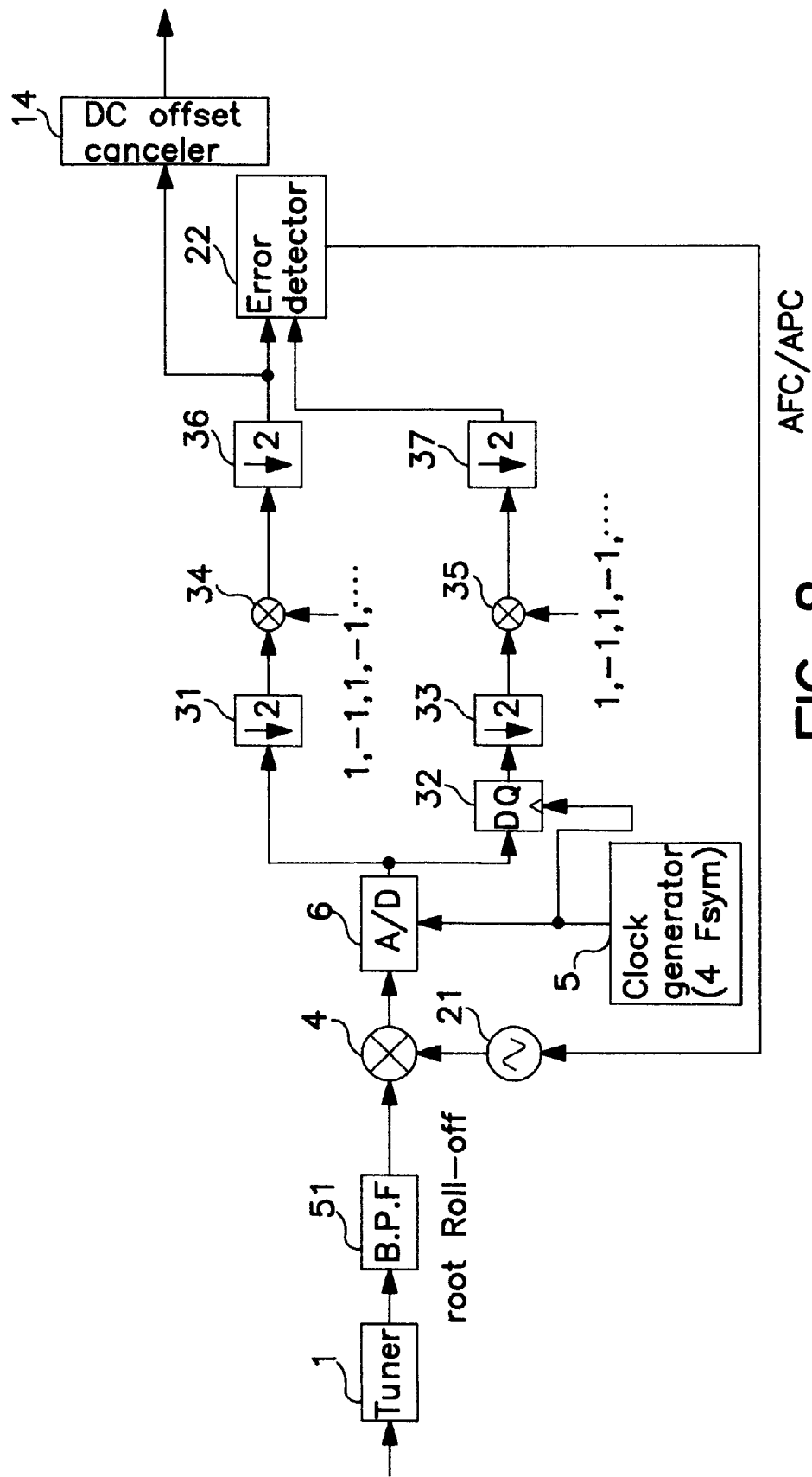
FIG. 8 is a block diagram of a VSB demodulator according to embodiment 8 of the invention.

FIG. 8 is a block diagram of a VSB demodulator in embodiment 8 of the invention. In FIG. 8, reference numeral 1 is a tuner for receiving a digital VSB modulated RF signal and converting into an IF signal, 51 is a root roll-off filter having a waveform shaping characteristic, 21 is a voltage control oscillator of which output frequency is determined by control voltage, 4 is a frequency converter for converting the IF signal into a second IF signal, 5 is a clock generator for generating a clock of four times of a symbol frequency, 6 is an A/D converter for converting an analog signal into a digital signal, 31 is a first decimating circuit for decimating Inphase and Quadrature digital data to a half, 32 is a latch for operating the Inphase and Quadrature digital data by a clock of four times of the symbol frequency, 33 is a second decimating circuit for decimating the latch output signals of Inphase and Quadrature digital data to a half, 34 is a first multiplier for multiplying repeatedly the output signal of the first decimating circuit by +1, −1 at the timing of a clock of two times of the symbol frequency, 35 is a second multiplier for multiplying repeatedly the output signal of the second decimating circuit by +1, −1 at the timing of a clock of two times of the symbol frequency, 36 is a third decimating circuit for decimating the Inphase data of output signal of the first multiplier 34 to a half, 37 is a fourth decimating circuit for decimating the Quadrature data of output signal of the second multiplier 35 to a half, 22 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and, while shaping the waveform by the root roll-off filter 51, extra spurious signals other than the IF signal are blocked. The IF signal passing through the root roll-off filter 51 is converted into a second IF signal by the voltage control oscillator 21 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are decimated to a half by the first decimating circuit 31 to be Inphase data, and delayed by one timing by the latch 32 and decimated to a half by the second decimating circuit 33 to be Quadrature data. The Inphase data is repeatedly multiplied by +1, −1 at the clock timing of two times of the symbol frequency by the first multiplier 34, and the Quadrature data is repeatedly multiplied by +1, −1 at the clock timing of two times of the symbol frequency by the second multiplier 35. Then, the Inphase data of output signal of the first multiplier 34 and the Quadrature data of output signal of the second multiplier 35 are interpolated to a half by the third decimating circuit 36 and fourth decimating circuit 37, respectively, to be converted into the original signal stream. Herein, the half interpolating process is effected by using the signal of the symbol frequency for clock regeneration.

From these Inphase and Quadrature data, a frequency and phase deviation vector is detected in the error detector 22, and on the basis of the inverse vector of the detected frequency deviation and phase deviation, a control signal of the voltage control oscillator 21 is generated, and by controlling the voltage control oscillator 21 by this control signal, the frequency deviation and phase deviation can be eliminated, and the output Inphase data of the third decimating circuit 36 becomes the VSB demodulated data. Since a DC offset is included in the VSB demodulated data, by removing the DC offset by the DC offset canceler 14, the VSB demodulated data only is obtained.

The error detector 22 operates same as in embodiment 2.

Thus, since the Inphase and Quadrature digital signals are decimated to a half, and then put into the complex type filter, the complex type filter is only required to have a filter coefficient in a double band of the symbol frequency. Moreover, since the control signals of the AFC and APC are fed back to the voltage control oscillator 21, they are fed into the complex type filter 9 without frequency error and phase error, so that accurate spectrum shaping is realized. Besides, since the A/D conversion is executed before detection, only one A/D converter is needed.

Yet, since the characteristic of waveform shaping is realized in the analog filter, not in the digital complex type filter, the circuit scale of the digital section may be considerably small.

In embodiment 8, the multipliers 34, 35 are used in the detection unit, but the constitution and operation for multiplying repeatedly +1, −1 may be realized by using the selector. and code inverter as shown in FIG. 13.

Incidentally, since all decimating circuits are designed to decimate to a half, the number of decimating circuits may be decrease by operating multiple times.

Similarly, by operating multiple times, the multipliers 34, 35 may be realized by one multiplier.

(Embodiment 9)

Figure 9:
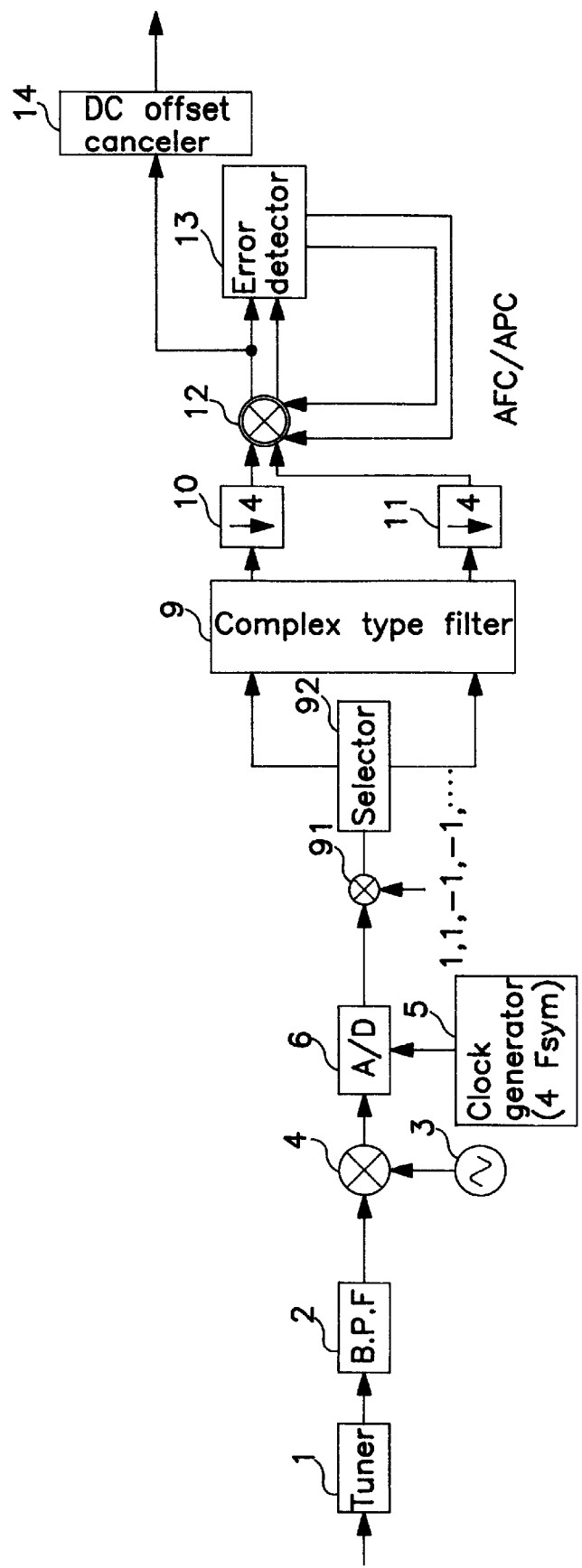
FIG. 9 is a block diagram of a VSB demodulator according to embodiment 9 of the invention.

FIG. 9 is a block diagram of a VSB demodulator in embodiment 9 of the invention. In FIG. 9, reference numeral 1 is a tuner for receiving a digital VSB modulated RF signal and converting into an IF signal, 2 is a band pass filter, 3 is a local oscillator, 4 is a frequency converter for converting the IF signal into a second IF signal, 5 is a clock generator for generating a clock of four times of a symbol frequency, 6 is an A/D converter for converting an analog signal into a digital signal, 91 is a multiplier for multiplying repeatedly +1, +1, −1, −1 at the timing of a clock of four times of the symbol frequency, 92 is a selector for dividing the output into two by changing over at the timing of a clock of four times of the symbol frequency, 9 is a complex type filter for processing Inphase and Quadrature data by spectrum shaping and VSB demodulation, 10 is a first decimating circuit for decimating Inphase data to a quarter, 11 is a second decimating circuit for decimating Quadrature data to a quarter, 12 is a complex multiplier, 13 is an error detector for detecting the vector of frequency deviation and phase deviation, and 14 is a DC offset canceler for removing the DC offset value.

In thus constituted VSB demodulator, the operation is described below. First, a digital VSB modulated RF signal is received by the tuner 1, and is converted into an IF signal, and extra spurious signals other than the IF signal are blocked by the band pass filter 2. The IF signal passing through the band pass filter 2 is converted into a second IF signal by the local oscillator 3 and frequency converter 4, and at the timing of the clock of the clock generator 5, the analog signal is converted into Inphase and Quadrature digital signals by the A/D converter 6. Herein, the clock generator 5 generates a signal at a symbol frequency of four times synchronized with the signal of the symbol frequency for clock regeneration. Consequently, the Inphase and Quadrature digital signals are repeatedly multiplied by +1, +1, −1, −1 at the timing of the clock of the clock generator 5 by the multiplier 91, and separated into Inphase data and Quadrature data at the timing of the clock of the clock generator 5 by the selector 92. After spectrum shaping and demodulation in the complex type filter 9, the Inphase data and the Quadrature data are interpolated to a quarter by the first decimating circuit 10 and second decimating circuit 11, respectively, to be converted into the original signal stream. Herein, the quarter interpolating process is effected by using the signal of the symbol frequency for clock regeneration.

These Inphase and Quadrature data are put into the complex multiplier 12, and from the output of this complex multiplier 12, the frequency and phase deviation vector is detected by the error detector 13, and by multiplying the inverse vector of the detected frequency deviation and phase deviation by the complex multiplier 12, the frequency deviation and phase deviation can be eliminated, and the output Inphase data of the complex multiplier 12 becomes the VSB demodulated data. Since a DC offset is included in the VSB demodulated data, by removing the DC offset by the DC offset canceler 14, the VSB demodulated data only is obtained.

The operation of the complex type filter 9 and error detector 13 is same as in embodiment 1.

Moreover, same as in embodiment 2, the AFC and APC may be realized by using the error detector 22, or the waveform shaping characteristic may be provided in the analog filter as in embodiment 5.

Thus, according to the embodiment, since the waveform is detected by using one multiplier and one selector, the number of multipliers can be decreased by one so that the circuit scale may be reduced.

In embodiment 9, the multiplier 91 is used in the detection section, but the constitution and operation for repeatedly multiplying +1, +1, −1, −1 may be realized by using a code inverter.

Thus, as clear from the description herein, in the invention, since the digital detection system is employed in VSB demodulation, the problem of orthogonality of half-pInphase shifter experienced in the analog detecting system is eliminated, and it brings about an outstanding effect of elimination of deterioration factors of temperature characteristics and others in the analog circuit.

What is claimed is:

1. A Vestigal Sideband (VSB) demodulator for use with a VSB signal, said demodulator comprising:
   a clock generator for generating a clock signal based on a symbol frequency of the VSB signal,
   an A/D converter for converting the VSB signal into a digital signal based on the clock signal of the clock generator,
   a first multiplier for i) multiplying the digital signal by a first value sequence based on the clock signal of the clock generator and ii) generating a first multiplier output signal,
   a second multiplier for )i multiplying the digital signal by a second value sequence based on the clock signal of the clock generator and ii) generating a second multiplier output signal,
   a complex type filter for i) shaping and VSB demodulation of the first multiplier output signal and the second multiplier output signal and ii) generating an Inphase data output signal and a Quadrature data output signal,
   a first decimating circuit for i) decimating the Inphase data output signal and ii) generating a first decimated signal,
   a second decimating circuit for i) decimating the Quadrature data output signal and ii) generating a second decimated signal,
   a complex multiplier for i multiplying the first decimated signal and the second decimated signal by a predetermined value and ii) generating a multiplied output signal,
   an error detector for i) detecting a frequency deviation and a phase deviation from the multiplied output signal of the complex multiplier, and ii) generating the predetermined value for the complex multiplier, and
   DC offset canceler for removing a DC component from a portion of the multiplied output signal of the complex multiplier.

2. A VSB demodulator of claim 1, wherein said complex type filter is a FIR filter, and the FIR filter i) multiplies the first multiplier output signal by a coefficient of a real portion of the FIR filter which is a transmission function having a roll-off characteristic of Nyquist second standard and Nyquist processing characteristic for a VSB modulated wave, ii) multiplies the second multiplier output signal by a coefficient of an imaginary portion of the FIR filter, iii) generates the Inphase data output signal by subtracting a multiplication result of the coefficient of the imaginary portion from a multiplication result of the real portion coefficient, and iv) generates the Quadrature data output signal by adding the multiplication result of the real portion coefficient and the multiplication result of the imaginary portion coefficient, thereby executing spectrum shaping and VSB demodulation of the Inphase and Quadrature data.

3. A VSB demodulator of claim 1, wherein said error detector includes a Delta-theta detector for detecting a differential phase vector from a code point assigned at the time of modulation from the output signals of the Inphase and Quadrature data of the complex multiplier, and a minus Delta-theta output unit for issuing an inverse vector of at least one of the frequency deviation and the phase deviation.

* * * * *

UNITED STATES PATENT AND TRADE MARK OFFICE
CERTIFICATE OF CORRECTION

PATENT NO.    : 6,067,329
DATED         : May 23, 2000
INVENTOR(S)   : H. Kato et al.

It is certified that error appears in the above-identified patent and that said Letters Patent is hereby corrected as shown below:

In column 16, line 3 of the Letters Patent, please delete "for )i" and insert therefor --for i)--.

In column 16, line 17 of the Letters Patent, please delete "for i" and insert therefor --for i)--.

Signed and Sealed this

Twenty-second Day of May, 2001

Attest:

NICHOLAS P. GODICI

Attesting Officer

Acting Director of the United States Patent and Trademark Office